UNITED STATES PATENT OFFICE.

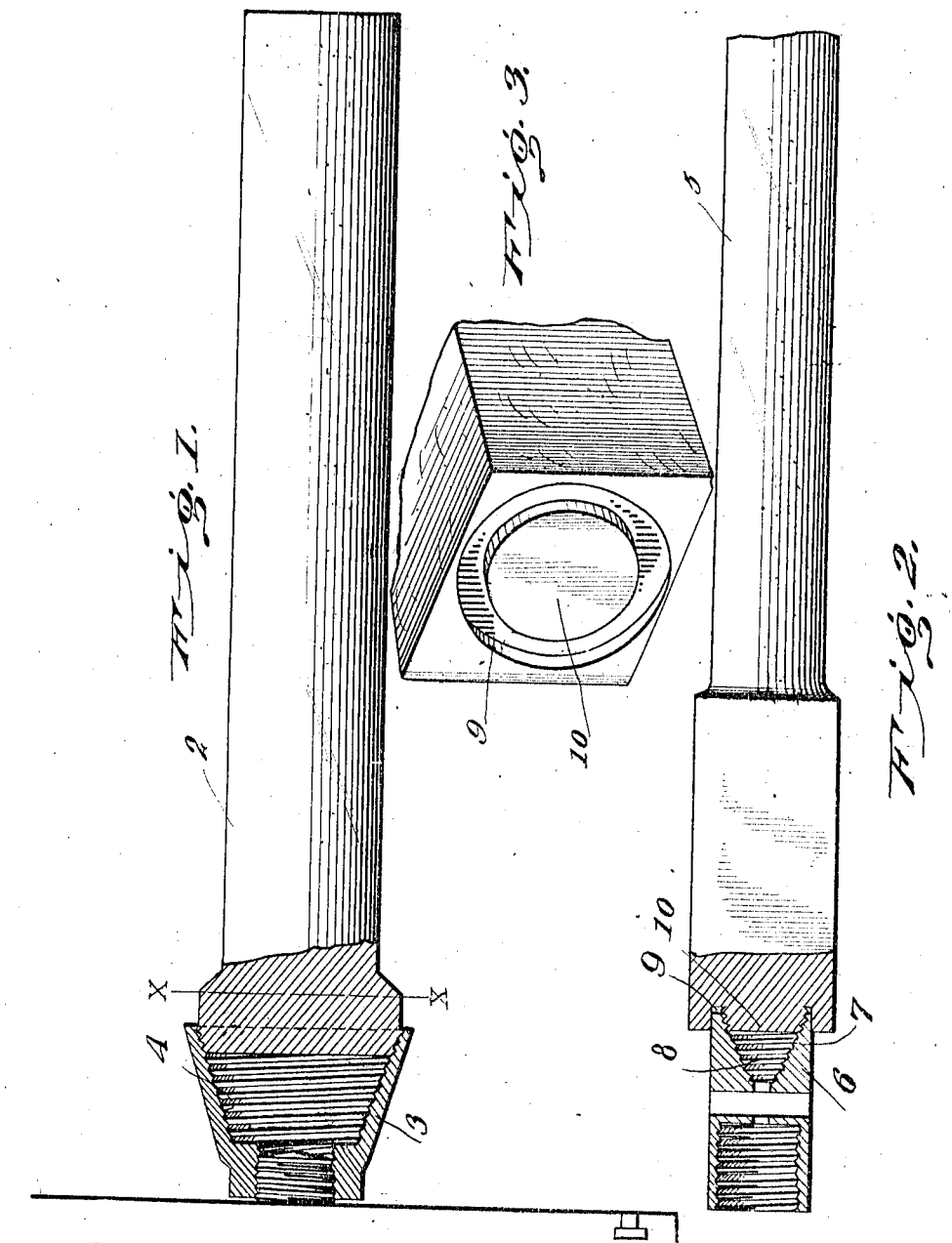

IPHUS H. GORDON, OF LYNDONVILLE, VERMONT, ASSIGNOR OF ONE-HALF TO LUCIUS H. GORDON, OF LYNDONVILLE, VERMONT.

METHOD OF PREPARING STOCK FOR SCREW-CHUCKS.

1,055,396.  Specification of Letters Patent.  Patented Mar. 11, 1913.

Application filed April 5, 1912. Serial No. 688,753.

*To all whom it may concern:*

Be it known that I, IPHUS H. GORDON, citizen of the United States, residing at Lyndonville, in the county of Caledonia and State of Vermont, have invented certain new and useful Improvements in Methods of Preparing Stock for Screw-Chucks, of which the following is a specification.

My invention relates to lathe practice, and particularly to a method whereby stock is engaged with a screw chuck.

In the ordinary "fancy" lathe, such as is used for variety wood-turning, the stock is not supported at opposite points but is supported at one end only in a screw chuck. A traveling ring is mounted upon the stock and is shiftable therealong, this ring carrying a knife whereby the stock is reduced in diameter and turned. Other knives acting at intervals form the object designed to be turned, and also act to cut off the several objects turned. In this form of lathe, the chuck is provided with internal screw threads, and the stock, which is square in section, is forced into the chuck while the chuck is being rotated, thereby forcing the internal screw threads into the stock and holding the stock firmly in engagement with the chuck. In this form of lathe using a screw chuck, the chuck is of course larger in diameter than the stock and as a consequence, the ring carrying the knife can not be forced adjacent to the chuck, and can not be moved over and beyond the chuck. The stock ordinarily used for variety turning is about two feet long and two inches square. Out of this two feet of stock, about four inches are lost, consequent upon the fact that the knife carrying ring can not be shifted into close proximity to the chuck. It is to avoid these objections, and to eliminate this excessive waste of wood, that I have devised the method which forms the subject of this invention.

This method, broadly speaking, consists in forming upon the butt end of the stock a central boss having an exterior diameter slightly larger than the screw threaded internal portion of the chuck and forcing this boss into the chuck so that the screw threads thereof will grip the boss and firmly engage the stock.

Specifically, my method consists in forming an annular groove in the butt end of the stock, this groove having an external diameter approximately equal to the external diameter of the chuck so that the mouth of the chuck will pass into the groove, this groove having an interior diameter such that the central boss surrounded by the groove is slightly larger than the diameter of the internally screw threaded portion of the chuck. By this means, the chuck when engaged with the stock projects into the annular groove, the outer face of the chuck engaging the outer wall of the groove while the internal screw threaded portion of the chuck engages with the exterior wall of the central boss, that is, with the interior wall of the groove. The chuck is of course smaller in exterior diameter than the stock and as a consequence the ring carrying the cutting knife or knives may be shifted along the whole extent of the stock, and only a relatively small portion, less than an inch in length of the stock, has to be wasted, thus saving a considerable percentage of the stock in each operation.

My invention is illustrated in the accompanying drawings wherein:

Figure 1 is a sectional view showing the old form of chuck and the old method of engaging stock with the chuck, the drawing also showing by the dotted line X—X the wastage due to this old method. Fig. 2 is a like view to Fig. 1 but showing my improved method of preparing the stock for engagement with the chuck and engaging it therewith. Fig. 3 is a perspective view of the chuck end of a piece of stock formed with an annular groove and central boss for engagement with the chuck.

Corresponding and like parts are referred to in the following description and indicated in all the views of the accompanying drawings by the same reference characters.

In Fig. 1, 2 designates stock which as stated is ordinarily about twenty-four inches long and which may be two inches square for ordinary work. The chuck is designated 3 and as shown is outwardly flared or bell-shaped ar' formed with interior screw threads designated 4. It is not considered necessary to illustrate the lathe in which the chuck is placed as my invention does not relate to the lathe nor to the chuck *per se* but simply to the method of engaging the stock with the chuck. In this form of chuck, the squared butt end of the stock is forced into the bell-shaped mouth of the chuck while the latter is rotating, and the rotation of the chuck causes the internal screw threads to engage with the corners of the stock and to draw the stock inward into the chuck and hold it firmly in place. The ring-shaped cutting knife (not illustrated) can only be moved up to the point indicated by line X—X and hence when the stock is cut off that portion of the stock from the line X—X to the butt end of the stock is wasted and must be thrown aside. This wastage occurs with every piece of stock and averages about nine per cent. Enough stock is thus wasted in the course of a day to pay the wages of the operator of the machine. It will consequently be seen that where a large number of lathes are in operation, the waste is exceedingly great, and that it is most important to reduce this waste to a minimum. I have succeeded in eliminating a very large proportion of this waste by preparing the stock as indicated in Fig. 2. In this figure, 5 designates the stock which is precisely the same as previously described and which when placed in the chuck is square in section. The chuck is designated 6 and is of the form shown in my prior patent granted on the 26th day of September, 1911, No. 1,004,415. This chuck has an exterior face parallel to the longitudinal axis of the chuck and is formed with an interior, somewhat conical, recess or mouth designated 7 which is interiorly screw threaded as at 8. In preparing the stock for use with the chuck, the butt end of the stock is formed with an annular groove 9 concentric to the axis of the stock, this groove in practice being about a quarter of an inch deep. The exterior wall of the groove may be relatively thin. The interior wall of the groove defines a central boss designated 10 having a diameter slightly greater than the internal diameter of the chuck so as to be firmly engaged by the screw threads thereon. The external diameter of the groove 9 is very slightly larger than the external diameter of the chuck itself so that the stock when engaged with the chuck will fit snugly around the exterior wall of the chuck.

With stock prepared as indicated, the butt end of the stock is placed against the chuck. The center boss 10 is engaged by the interior screw threads of the chuck, and the stock therefore drawn into the chuck. When drawn home, the stock is firmly engaged by the chuck, more firmly than in the old form of chuck. By this arrangement, a chuck having a less external diameter than the external diameter of the stock is used and hence the knife-carrying ring may be shifted longitudinally along the stock the entire length thereof, and the stock used up nearly to the end of the chuck. Ordinarily, however, the stock is used up to about one inch from the butt end of the stock. There is thus a saving of at least three-fourths.

The ordinary spur chuck used in turning lathes presupposes a lathe in which the stock is held by two centers, and in this construction the wood is driven onto the spur chuck by force from the dead center, or forced up by a blow from a mallet or by a screw. While this method of engaging the stock with the chuck would permit the circular cutting member to be shifted entirely along the stock, it would not be possible to use this spur chuck with a lathe of the character described. My method is therefore peculiarly adapted for use with screw chucks where the stock is only supported at one end and not at opposite ends, and where the work must have a very firm engagement with the chuck. It is to be particularly noted that with my method the chuck not only engages the central boss but also engages the exterior wall, and that thus an even firmer engagement is secured between the work or stock and the chuck than where the chuck engages the exterior of the stock and only engages the corners thereof.

My invention has been thoroughly tried out in practice and the saving referred to above is not problematical but is an actual fact. The value and advantage incident to this invention are therefore very plainly evident.

By the use of my method of preparing the stock, it is possible to use one size chuck either with large or small stock as the same sized annular slot or groove is used for all sizes of stock. This is due largely to the fact that the double thread secures a double purchase and will hold three inch stock with a one and one-half inch groove.

What I claim is:

1. A method of preparing stock for use with screw chucks which consists in forming an annular groove in the butt end of the stock, the groove having an exterior diameter approximately equal to the exterior diameter of the chuck, and an interior diameter slightly less than the screw threaded interior portion of the chuck whereby to leave a central boss adapted to be engaged by the screw threads of the chuck, thereby to permit the passage of a circular cutting tool along the whole extent of the stock and over the chuck.

2. A method of preparing stock for use with chucks which consists in forming an annular groove in the butt end of the stock, the groove having an exterior diameter approximately equal to the exterior diameter of the chuck, and an interior diameter slightly less than the work engaging interior face of the chuck whereby to leave a central boss adapted to be engaged by the interior work engaging face of the chuck thereby to permit the passage of a circular cutting tool along the whole extent of the stock and over the chuck.

In testimony whereof I affix my signature in presence of two witnesses.

TITUS H. GORDON. [L. S.]

Witnesses:
 N. A. NORTON,
 E. A. COOK.